Feb. 21, 1939.    R. S. SANFORD    2,148,280
CLUTCH AND BRAKE CONTROL MECHANISM

Original Filed Aug. 14, 1931

INVENTOR.
ROY S. SANFORD
BY
    ATTORNEY

Patented Feb. 21, 1939

2,148,280

UNITED STATES PATENT OFFICE 2,148,280

CLUTCH AND BRAKE CONTROL MECHANISM

Roy S. Sanford, New York, N. Y., assignor to Bragg-Kliesrath Corporation, South Bend, Ind., a corporation of New York Original application August 14, 1931, Serial No. 557,136. Divided and this application September 27, 1935, Serial No. 42,417

4 Claims. (Cl. 192—.01)

This invention relates in general to control mechanisms for automotive vehicles and more particularly to means for controlling the operation of the throttle, clutch, and brakes.

It is the principal object of the invention to provide power means, preferably of the vacuum operated pressure differential type, for operating the clutch, said power means being controlled by the accelerator and cooperating with a second manually operable pedal controlling both the clutch and the brakes. There is thus provided but two manually operable pedals for operating three of the major controls of the vehicle; namely, the throttle, the clutch and the brakes, the clutch being operable by either of said pedals.

Other objects of the invention and desirable details of construction and combinations of parts will become apparent from a detailed description of certain embodiments of the invention, described in detail in the following specification taken in conjunction with the accompanying drawing illustrating said embodiments, in which.

Figure 1:
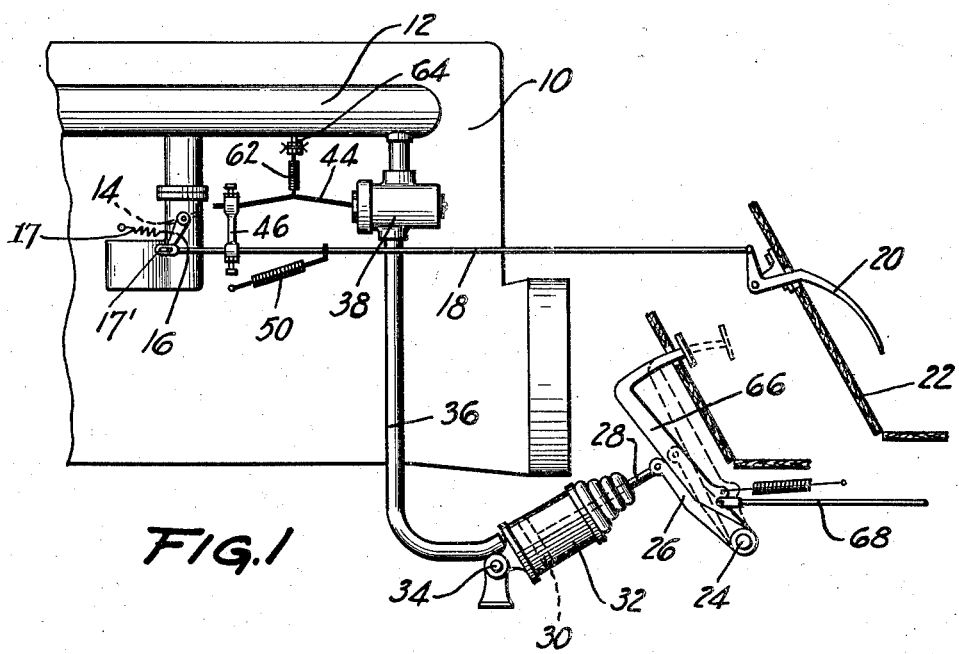
Figure 1 is a diagrammatic longitudinal section through part of an automobile chassis showing the clutch, throttle and brake control in side elevation.

In the arrangement illustrated, the automobile engine is indicated at 10, being provided with the usual intake manifold 12 and controlled by the usual butterfly valve or throttle 14 operated by an arm 16, biased to its closed position by a spring 17. The throttle arm 16 is operatively connected, (preferably by means of a slotted or other one-way connection 17') by means of a rod or the like 18, to an accelerator pedal or other control 20, shown pivoted on the floorboard 22.

The clutch, which may be of any usual form and which is therefore not illustrated per se, may be operated by the usual control shaft 24 on which is fixed an actuating device such as a lever 26, shown arranged below the floorboard. Lever 26 is illustrated as connected, by means such as a pivoted connecting rod 28, to a piston 30 or its equivalent arranged in a cylinder 32 pivoted at 34 to a fixed bracket.

Figures 2, 3:
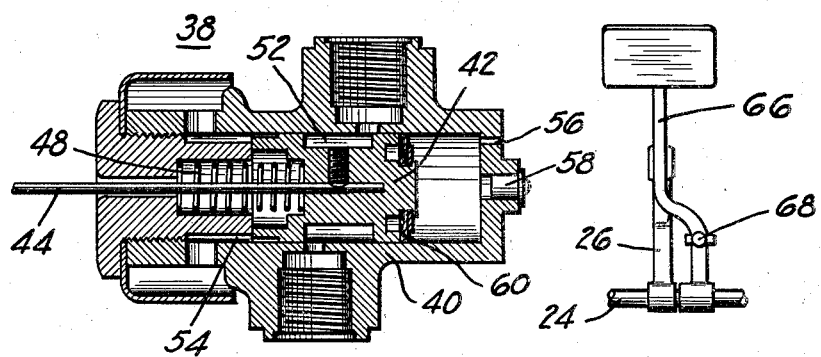
Figure 2 is a section through the clutch control valve of the mechanism of Figure 1.
Figure 3 is an elevation of the clutch operating lever and a one-way connection between said lever and the brake pedal.

Cylinder 32 is connected to the manifold 12 by a conduit 36 controlled by a valve 38, shown in detail in Figure 2. The particular valve illustrated, which is more particularly described and claimed in an application of Victor W. Kliesrath, No. 568,081, filed October 10, 1931, includes a casing 40 forming a valve cylinder, and within which is arranged a valve piston 42 connected by a wire or the like flexible connection 44 to a bracket 46 fixedly (and adjustably) secured to the throttle rod 18. The valve piston 42 is actuated by tension on connection 44 against the resistance of a valve spring 48, which is lighter than the throttle return spring 50.

In its position, which it assumes when the accelerator pedal 20 is released by the driver, and which is shown in Figure 3, the throttle return spring 50 overcomes the valve spring 48 and holds the valve piston in the position shown, with an annular passage 52 establishing communication between the manifold 12 and the conduit 36. The lever 26 is therefore held down, with the clutch thrown out, by the vacuum power device 30—32.

If the accelerator pedal is depressed, valve spring 48 is permitted to shift the valve piston to the right, cutting off communication with the manifold and establishing communication between conduit 36 and the atmosphere through a passage 54. A vent 56 facilitates movement of the valve piston. An inwardly-opening check valve 58 may be provided, if desired, so that vent 56 may be made small enough so that movement of the valve piston to the left will be practically unobstructed, whereas movement to the right will be relatively sluggish. A friction disk 60, slidingly engaging the valve cylinder wall, also acts to give a substantially uniform movement of the valve to the right, regardless of how slowly or rapidly the accelerator 20 is depressed.

The valve action, and especially the timing, is modified by means such as a spring 62 acting transversely and resiliently on connection 44, and which is arranged to be adjusted as to tension by means of a threaded eyebolt or the like 64 by means of which the upper end of the spring is attached to a fixed bracket. This construction constitutes the essence of my application No. 557,136, filed August 14, 1931, of which the instant application is a division.

The relative timing of operation of the valve and throttle is, in a measure, determined by the slotted connection 17', the parts being so constructed and arranged that the valve 38 is operated to effect a disengagement of the clutch only after the throttle is closed. It, therefore, follows that the valve 38 is operated to effect an engagement of the clutch before the throttle is opened.

The above description will make clear the power portion of the clutch under the control of the accelerator pedal or its equivalent. It is desirable, however, that some auxiliary means be provided for manually operating the clutch in the case of failure of the power mechanism. To this end, I provide a pedal 66 loosely sleeved over the shaft 24 and operatively connected to the brakes or brake operating means by a rod 68. The pedal 66 is preferably offset, as disclosed in Figure 3, to enable the upper portion thereof to contact with the clutch operating lever 26. Preferably the construction should be such that the clutch is disengaged before the brakes are applied.

The one-way connection between the pedal 66 and the lever 26 provides a means enabling a power operation of the clutch to the exclusion of the operation of the brakes. This construction also makes possible a manual operation of the clutch should there be a failure of the clutch operating power means. Furthermore, there is provided a simple and compact arrangement of two manually operable pedals for operating the throttle, clutch and brakes of the vehicle, either of said pedals serving to operate the clutch.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with power transmission controls including a throttle, a clutch and a brake, means for operating said controls comprising two independently and selectively operable manually operated members, said mechanism being so constructed and the parts being so arranged that one of said members may be so actuated as to effect a successive operation of the throttle and the clutch and that the other of said members functions to effect an operation of both the brake and the clutch.

2. In an automotive vehicle provided with controls including a brake, a clutch and a throttle, means for effecting the operation of said controls including power means for operating one of said controls and further including but two independently operable and manually operated members each of said members serving to operate at least two of said controls.

3. An automotive vehicle provided with speed controls including a throttle, a clutch and a brake, and comprising, in combination therewith, means for operating said controls including two and only two manually operable members each of said members serving to control the operations of at least two of said controls.

4. In an automotive vehicle provided with a throttle, a clutch, brakes and a driver's compartment comprising a floor-board, two and only two manually operable members projecting from said board, said members serving to selectively operate the throttle and brakes, one of said members functioning to effect an operation of both the clutch and brakes.

ROY S. SANFORD.